US012687849B2

(12) United States Patent
Lundh et al.

(10) Patent No.: US 12,687,849 B2
(45) Date of Patent: Jul. 21, 2026

(54) MOTION CONTROL SYSTEM AND CONTROLLERS FOR A MARINE VESSEL

(71) Applicant: ABB Schweiz AG, Baden (CH)

(72) Inventors: Michael Lundh, Västerås (SE); Jonas Linder, Västerås (SE); Hamid Feyzmahdavian, Stockholm (SE)

(73) Assignee: ABB SCHWEIZ AG, Baden (CH)

( * ) Notice: Subject to any disclaimer, the term of this patent is extended or adjusted under 35 U.S.C. 154(b) by 183 days.

(21) Appl. No.: 18/342,857

(22) Filed: Jun. 28, 2023

(65) Prior Publication Data

US 2024/0004387 A1      Jan. 4, 2024

(30) Foreign Application Priority Data

Jun. 30, 2022     (EP) ..................................... 22182300

(51) Int. Cl.
| | |
|---|---|
| *G05D 1/00* | (2024.01) |
| *B63B 79/40* | (2020.01) |
| *B63H 21/21* | (2006.01) |

(52) U.S. Cl.
CPC ........... *G05D 1/0206* (2013.01); *B63B 79/40* (2020.01); *B63H 21/21* (2013.01); *B63H 2021/216* (2013.01)

(58) Field of Classification Search
CPC ........ G05D 1/0206; G05D 1/43; G05D 1/606; G05D 2101/24; G05D 2107/27;
(Continued)

(56) References Cited

U.S. PATENT DOCUMENTS

| | | | |
|---|---|---|---|
| 11,598,282 B1 * | 3/2023 | Josselyn | ................. B63B 79/20 |
| 11,827,319 B1 * | 11/2023 | Perdomo Tornbaum | .................... B63B 79/40 |

(Continued)

FOREIGN PATENT DOCUMENTS

| | | |
|---|---|---|
| CN | 109683472 A | 4/2019 |
| CN | 111439249 A | 7/2020 |

OTHER PUBLICATIONS

Veksler Aleksander et al; "Dynamic Positioning With Model Predictive Control"; IEEE Transactions on Control Systems Technology, IEEE Service Center, New York, NY; vol. 24, No. 4, Jul. 1, 2016; 14 Pages.

(Continued)

*Primary Examiner* — Krishnan Ramesh
(74) *Attorney, Agent, or Firm* — Greenberg Traurig, LLP

(57) ABSTRACT

A high-level motion controller provides a lower-level thrust allocation with generalized forces demanded on the ship for the current instant of time as well as a prediction of future generalized forces $$\{\hat{\tau}_D\}_{t=0}^{T}$$

demanded over a predicted future time, and optionally one or more other reference predictions, such as a time-varying velocity and position of the ship $$\{\hat{\eta}_D, \hat{v}_D\}_{t=0}^{T}.$$

When predictions of the future desired forces and torque are made available to the lower-level thrust allocation, the (Continued)

lower-level thrust allocation will be aware of what is needed in the future and use the predictions to make efficient changes towards the desired future references, when it generates control signals to thrusters available in the thruster system to distribute the desired generalized forces into individual forces of the individual thrusters.

20 Claims, 4 Drawing Sheets

(58) Field of Classification Search
CPC .... G05D 2109/34; B63B 79/40; B63H 21/21; B63H 2021/216; G05B 19/0421
USPC ............................................ 701/21
See application file for complete search history.

(56) References Cited

U.S. PATENT DOCUMENTS

| | | | | |
|---|---|---|---|---|
| 2003/0150366 A1* | 8/2003 | Kaufmann | ............. | B63H 25/42 |
| | | | | 114/144 RE |
| 2006/0116796 A1* | 6/2006 | Fossen | .................... | B63B 79/20 |
| | | | | 701/1 |
| 2014/0330432 A1 | 11/2014 | Simaan et al. | | |
| 2015/0142227 A1* | 5/2015 | Stephens | ................ | B63H 25/42 |
| | | | | 701/21 |
| 2016/0252907 A1* | 9/2016 | Parkinson | ............ | G05D 1/0206 |
| | | | | 701/21 |
| 2018/0062388 A1* | 3/2018 | Mathiesen | ................ | H02J 3/28 |
| 2018/0134361 A1* | 5/2018 | Biebach | .................. | B63H 21/17 |
| 2020/0115012 A1 | 4/2020 | Orivuori et al. | | |
| 2021/0094659 A1* | 4/2021 | Akuzawa | ................ | B63B 79/15 |
| 2021/0285771 A1* | 9/2021 | Mertes | .................... | B63B 71/00 |
| 2022/0063776 A1* | 3/2022 | Biancale | ................. | B63B 49/00 |
| 2022/0177102 A1* | 6/2022 | Nydahl | .................. | B63H 21/21 |
| 2023/0033185 A1* | 2/2023 | Ross | ....................... | B63H 21/21 |
| 2023/0114136 A1* | 4/2023 | Osaki | ....................... | G05D 1/43 |
| | | | | 701/21 |
| 2023/0234686 A1* | 7/2023 | Liu | ........................... | B63H 1/10 |
| 2024/0158063 A1* | 5/2024 | Kalnins | .................. | B60L 58/21 |
| 2024/0158064 A1* | 5/2024 | Taylor | ................. | B63H 20/007 |

OTHER PUBLICATIONS

European Search Report; Application No. EP2218230; Completed: Nov. 21, 2022; 2 Pages.

Hongli Chen et al: Model predictive controller design for the dynamic positioning system of a semi-submersible platform; Journal of Marine Science and Application, Harbin Engineering University, Heidelberg; vol. 11, No. 3; Sep. 18, 2012; 7 Pages.

Chinese Office Action; Application No. 2023107832760; Completed: Apr. 10, 2026; Issued: Apr. 13, 2026; 12 Pages.

* cited by examiner

20

202

Motion Control System (MCS)

$\{\hat{\eta}_r, \hat{v}_r\}_{t=0}^T$

High-level
Motion
Controller $\{\hat{\tau}_D\}_{t=0}^T$ $\{\hat{\eta}_D, \hat{v}_D\}_{t=0}^T$ Parameter
Calculator p Thrust
allocation
(TA)

u $\hat{\tau}$ 200                          204                    Fig. 2B

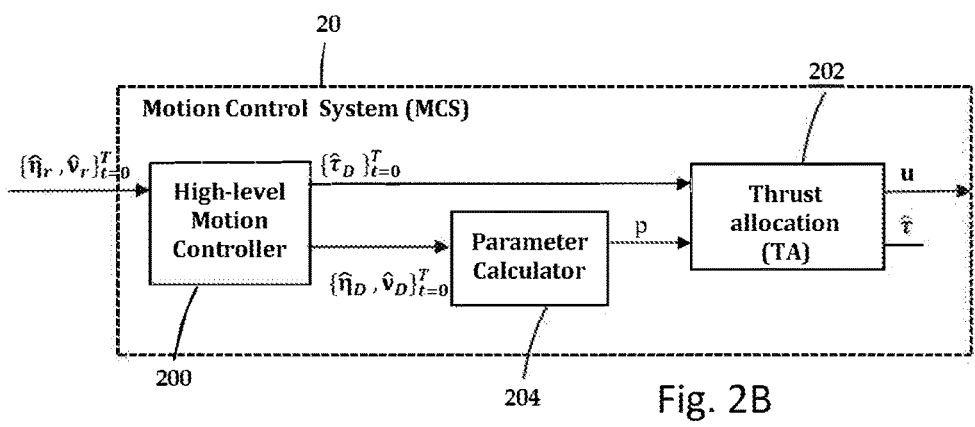

20

100

Motion Control System (MCS)          u

Thruster System

122      SD

120

12

Th₁      128

Steering module
Propulsion module

280°

Motor 124  126                128

Propulsion
Drive

112

Electric
Power
Plant

123      SD

121

12

Th₂      129

Steering module
Propulsion module

280°

Motor 125                129

127

Propulsion
Drive

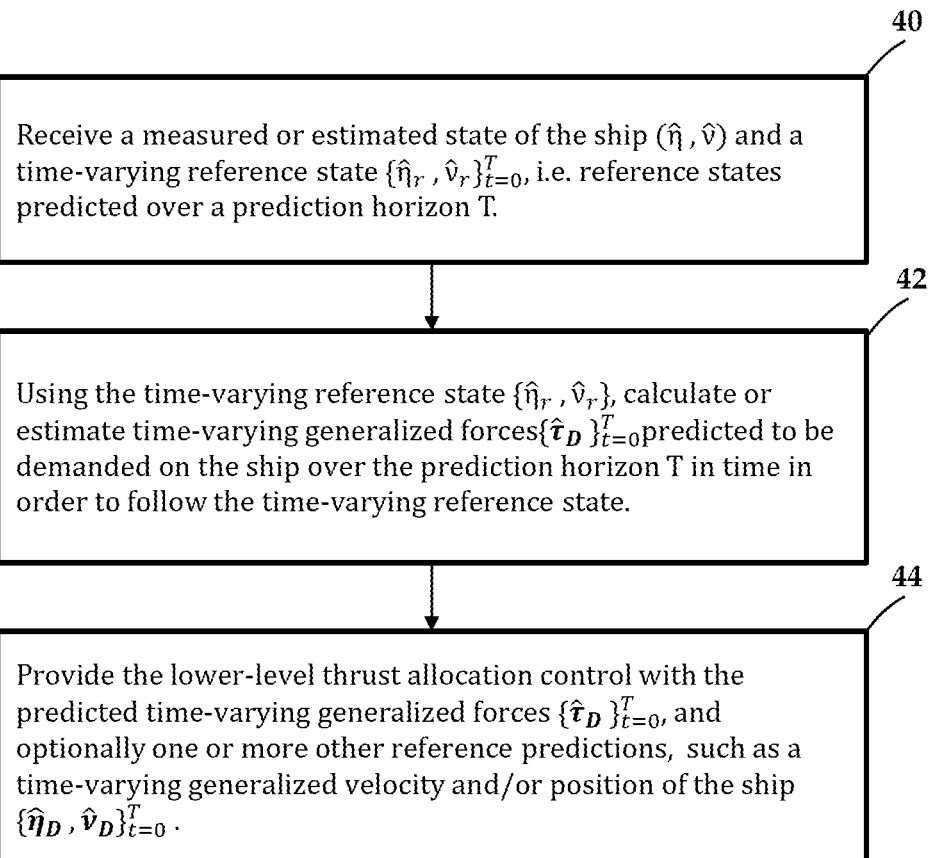

40

Receive a measured or estimated state of the ship ($\hat{\eta}$, $\hat{v}$) and a time-varying reference state $\{\hat{\eta}_r, \hat{v}_r\}_{t=0}^{T}$, i.e. reference states predicted over a prediction horizon T.

42

Using the time-varying reference state $\{\hat{\eta}_r, \hat{v}_r\}$, calculate or estimate time-varying generalized forces $\{\hat{\tau}_D\}_{t=0}^{T}$ predicted to be demanded on the ship over the prediction horizon T in time in order to follow the time-varying reference state.

44

Provide the lower-level thrust allocation control with the predicted time-varying generalized forces $\{\hat{\tau}_D\}_{t=0}^{T}$, and optionally one or more other reference predictions, such as a time-varying generalized velocity and/or position of the ship $\{\hat{\eta}_D, \hat{v}_D\}_{t=0}^{T}$.

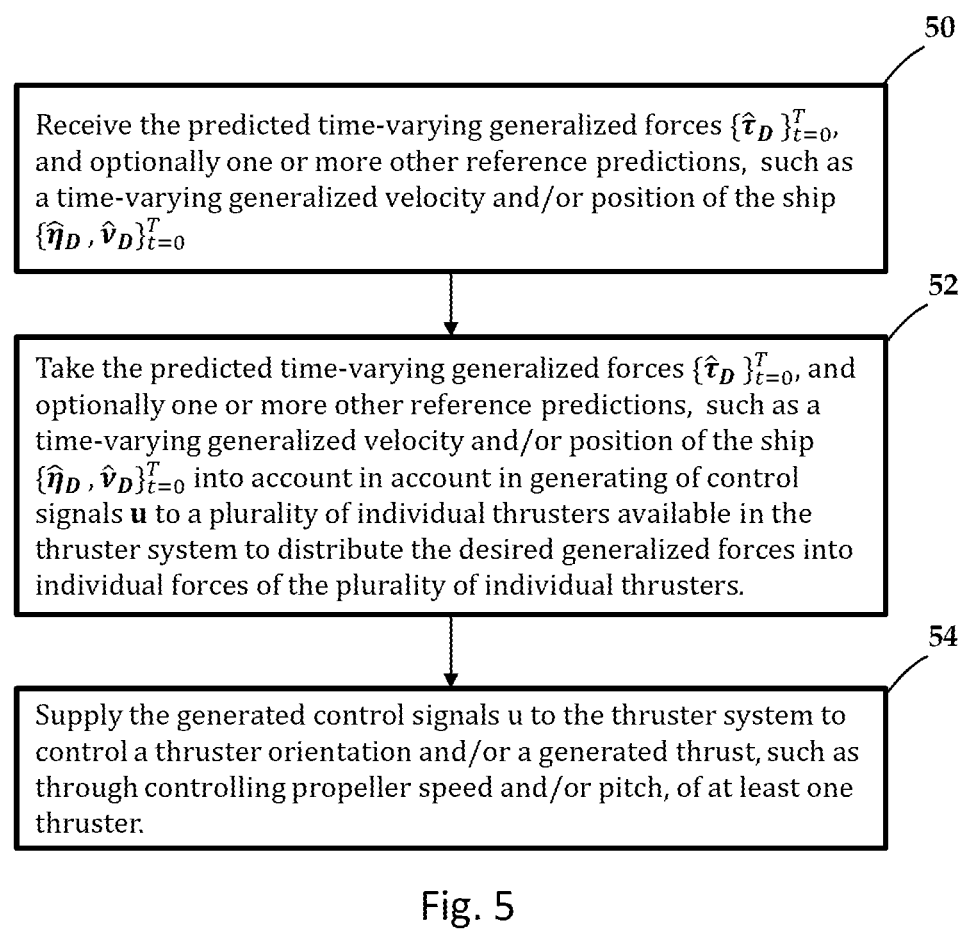

Receive the predicted time-varying generalized forces $\{\hat{\tau}_D\}_{t=0}^T$, and optionally one or more other reference predictions, such as a time-varying generalized velocity and/or position of the ship $\{\hat{\eta}_D, \hat{v}_D\}_{t=0}^T$

52

Take the predicted time-varying generalized forces $\{\hat{\tau}_D\}_{t=0}^T$, and optionally one or more other reference predictions, such as a time-varying generalized velocity and/or position of the ship $\{\hat{\eta}_D, \hat{v}_D\}_{t=0}^T$ into account in account in generating of control signals u to a plurality of individual thrusters available in the thruster system to distribute the desired generalized forces into individual forces of the plurality of individual thrusters.

54

Supply the generated control signals u to the thruster system to control a thruster orientation and/or a generated thrust, such as through controlling propeller speed and/or pitch, of at least one thruster.

Fig. 5

MOTION CONTROL SYSTEM AND CONTROLLERS FOR A MARINE VESSEL

FIELD OF THE INVENTION

The invention relates to motion control of marine vessels, and particularly thrust allocation in motion control.

BACKGROUND OF THE INVENTION

Marine ship or vessel may be equipped with any number and different types of actuators or thrusters depending on the intended use. The purpose of the actuator is to produce a controlled force on the vessel to obtain the desired movement. Motion control systems for ships are traditionally divided in one high-level control function that provides generalized forces to be applied on the ship and one thrust allocation function that distributes these forces over available thrusters. This approach is modular by design and allows the possibility to combine solutions from different vendors. The benefit is a segmented software, aiding in development and commissioning.

The drawback of this decoupling is that the high-level controller at best has an approximate model of the capabilities in the thruster system. This approach has a limited capability to handle constraints for the thrusters mainly in terms of the rate of changes for the individual thrusters and to understand the long-time benefits. This typically leads to a mismatch between desired and achieved force and torque, especially when the control becomes aggressive, such as short stopping maneuvers.

Rotatable thrusters, and particularly azimuthing podded thrusters, comprises a propeller that can be rotated or turned to different orientations in the horizontal plane so that it can produce forces in different directions. To avoid situations where rotatable thrusters must be turned from one orientation to another and during that turning period cannot provide the required forces to obtained the desired movement, it may be needed to limit the bandwidth of the high-level controller, which will affect the performance.

Combined approaches have also been proposed where the thrust allocation is integrated into a Model Predictive Control (MPC) based high-level motion control function. This offers improvements in control performance compared to capabilities of the traditional decoupled approaches. The combined motion control has full knowledge on the state and limitations of the thrusters and can coordinate them more efficiently over time. It accounts for the delay caused by the rotation time of the thrusters when planning the motion. The disadvantages of the combined motion control approaches are that they are non-modular and will result in an optimization problem that is more difficult to solve.

BRIEF DESCRIPTION OF THE INVENTION

An object of the present invention is to alleviate the disadvantages of decoupled and combined motion control systems.

This object of the invention is achieved by a motion control system, controllers, and computer-readable medium recited in the independent claims. Preferred embodiments of the invention are disclosed in the dependent claims.

An aspect of the invention is a motion control system for controlling motion of a marine vessel, comprising a higher-level motion controller and a lower-level thrust allocation controller, wherein the higher-level motion controller is configured to determine desired generalized forces to be exerted on the marine vessel by a thruster system to achieve a desired motion of the marine vessel, and to input the desired generalized forces to the lower-level thrust allocation controller, wherein the lower-level thrust allocation controller is configured to generate control signals to a plurality of individual thrusters available in the thruster system to distribute the desired generalized forces into individual forces of the plurality of individual thrusters, at least one of the plurality of individual thrusters being a rotatable or azimuthing thruster, and the control signals of the at least one rotatable or azimuthing thruster controlling at least a thruster orientation and a generated thrust, preferably through controlling propeller speed and/or pitch, wherein the higher-level motion controller is configured to determine and input to the lower-level thrust allocation controller both the desired generalized forces both for the current instant of time and the desired future generalized forces to be exerted on the marine vessel, and optionally one or more further reference predictions or allocation parameters, and wherein the lower-level thrust allocation controller is configured to take the desired future generalized forces, and optionally the one or more further reference predictions or allocation parameters, into account in generation of the control signals for the current instant of time.

In an embodiment, the higher-level motion controller is configured to input to the lower-level thrust allocation controller both the desired generalized forces both for the current instant of time and the desired future generalized forces to be exerted on the marine vessel, and a prediction of future generalized velocity of the marine vessel and/or a prediction of future generalized position of the marine vessel; and the lower-level thrust allocation controller is configured to take the desired future generalized forces, and the predicted future generalized velocity of the and/or the predicted future generalized position of the marine vessel, into account in generation of the control signals for the current instant of time.

In an embodiment, the lower-level thrust allocation controller is configured to receive the desired generalized forces both for the current instant of time and the desired future generalized forces to be exerted on the marine vessel from the high-level motion controller; the lower-level thrust allocation controller is configured to receive the allocation parameters from the high-level motion controller or an allocation parameter calculation unit; and the lower-level thrust allocation controller is configured to take the desired future generalized forces, and the allocation parameters, into account in generation of the control signals for the current instant of time.

In an embodiment, the lower-level thrust allocation controller comprises predictive control, preferably Model Predictive Control (MPC), that is configured to predict future control inputs and/or future constrains based on the desired future generalized forces, and optionally based the one or more further reference predictions, and further configured to use the predicted future control inputs and/or predicted future constrains in generation of the control signals for the current instant of time.

In an embodiment, the lower-level thrust allocation controller is configured to vary constrains of generation of the control inputs over the prediction horizon depending on one or more of: time, the predicted future generalized force, the predicted future generalized velocity of the marine vessel, and the predicted future generalized position of the marine vessel.

In an embodiment, the lower-level thrust allocation controller is configured to estimate and use at least a propulsion force of the at least one rotatable or azimuthing thruster in generation of the control inputs.

In an embodiment, the lower-level thrust allocation controller is configured to estimate and use both a propulsion force and a rudder force of the at least one rotatable or azimuthing thruster in generation of the control inputs.

A second aspect of the invention is the higher-level motion controller of the motion control system according to the first aspect of the invention, wherein the higher-level motion controller comprises one or more processors, and one or more memories including a first computer program code, which, when loaded into the one or more processors and executed by the one or more processors, causes the high-level motion controller to determine and input to the lower-level thrust allocation controller both the desired generalized forces both for the current instant of time and the desired future generalized forces to be exerted on the marine vessel, and optionally one or more further reference predictions or allocation parameters.

A third aspect of the invention is the higher-level motion controller of the motion control system according to the first aspect of the invention, wherein the lower-level thrust allocation controller comprises one or more processors, and one or more memories including a second computer program code, which, when loaded into the one or more processors and executed by the one or more processors, causes the lower-level motion controller to generate control signals to a plurality of individual thrusters available in the thruster system to distribute the desired generalized forces into individual forces of the plurality of individual thrusters, and to take the desired future generalized forces, and optionally the one or more further reference predictions or allocation parameters, into account in generation of the control signals for the current instant of time.

A fourth aspect of the invention is a computer-readable medium comprising the first computer program code for the higher-level motion controller according to the second aspect, which, when loaded into the controller and executed by the controller, causes the controller to determine and input to the lower-level thrust allocation controller both the desired generalized forces both for the current instant of time and the desired future generalized forces to be exerted on the marine vessel, and optionally one or more further reference predictions or allocation parameters.

A fifth aspect of the invention is a computer-readable medium comprising the second computer program code for the lower-level thrust allocation controller according to the third aspect, which, when loaded into the controller and executed by the controller, causes the controller to generate control signals to a plurality of individual thrusters available in the thruster system to distribute the desired generalized forces into individual forces of the plurality of individual thrusters, and to take the desired future generalized forces, and optionally the one or more further reference predictions or allocation parameters, into account in generation of the control signals for the current instant of time.

A sixth aspect of the invention is a marine vessel, comprising a motion control system according to the first aspect.

BRIEF DESCRIPTION OF THE DRAWINGS

In the following, the invention will be described in greater detail by means of preferred embodiments with reference to the attached drawings, in which

FIG. 2B shows a functional motion control system according to a further exemplary embodiment;

FIG. 3 shows functional block diagram illustrating an exemplary thruster system that comprises electric podded azimuthing thrusters, FIG. 4 shows a flow diagram illustrating an exemplary operation of a high-level motion controller, and FIG. 5 shows a flow diagram illustrating an exemplary operation of a lower-lever thrust allocation controller.

DETAILED DESCRIPTION OF EXEMPLARY EMBODIMENTS

| Acronyms and symbols Lowercase bold symbols denote vectors, uppercase bold symbols denote matrices, and non-bold symbols denote scalars. | |
| --- | --- |
| $\eta$ | Earth-fixed generalized positions of vessel |
| $v$ | Body-fixed generalized velocities of vessel |
| $\hat{\eta}$ | Estimate of $\eta$ |
| $\eta_D$ | Desired positions of vessel |
| $\eta_r$ | Reference positions of vessel |
| $\hat{v}$ | Estimate of $v$ |
| $\hat{v}_D$ | Desired velocities of vessel |
| $\hat{v}_r$ | Reference velocity of vessel |
| $T_D$ | Desired thrust forces |
| $T_C$ | Actual thruster forces exerted on the vessel |
| $T_{env}$ | Environmental forces |
| $y$ | Measurement vector |
| $u$ | Control input vector to thrusters |
| $u$ | Surge velocity (forward velocity in the direction of the bow) |
| $v$ | Sway velocity (sideways velocity towards the starboard) |
| $r$ | Yaw velocity (clockwise yaw rotation rate) |
| $V$ | Total velocity of the vessel |
| $x, y$ | Position in an Earth-fixed coordinate system |
| $\psi$ | Yaw angle |
| $\beta$ | Sideslip angle of the vessel |
| $f_i$ | Axial thrust magnitude of the thruster |
| $R_i$ | Rudder force of the thruster |
| $k_i$ | Constant |
| $I_{x,1}, I_{y,i}$ | Mounting position of thruster i in body-fixed coordinate system |
| $n_i$ | Propeller speed or propeller angular velocity of thruster i |
| $\alpha_i$ | Angle of thruster i |
| $D_i$ | Diameter of the propeller of thruster i |
| $V_a$ | Speed of the water stream along the propeller axis |
| $i$ | Thruster index, i = 1, 2, ... , M |
| $t_i$ | Thrust configuration vector of a thruster Thi |
| $T(\alpha)$ | Thruster configuration matrix of M thrusters |
| $f(n)$ | Thruster force function of M thrusters |
| $D$ | Damping matrix |
| $T_s$ | Sample time, $T_s = 1/\text{sample rate}$ |
| $N$ | Prediction horizon in number of sample times, $T/T_s$ |
| $T$ | Prediction horizon in time, $N*T_s$ |
| $k$ | Sample time index, k = 0, 1, 2, ... , N |
| $u_k$ | Control input at sample time k |
| $v_k$ | Generalized velocity of vessel at sample time k |
| $u_k^{lo}(v_k)$ | Minimum $u_k$ for $v_k$ at sample time k |
| $u_k^{hi}(v_k)$ | Maximimum $u_k$ for $v_k$ at sample time k |
| $T_i$ | Model of the propulsion force Ti (thrust) |
| $P(.)$ | Power cost function |

-continued

| Acronyms and symbols |
| :--- |
| Lowercase bold symbols denote vectors, uppercase bold symbols denote matrices, and non-bold symbols denote scalars. |

| | |
| :--- | :--- |
| $\mathbf{F}(.)$ | Represents the thruster dynamics |
| $\gamma_0$, $\gamma_i$, $\gamma_2$ | Propeller-specific coefficients |
| $\mathbf{Q}_\Delta$ | User-selected tuning parameters |

Figure 1:
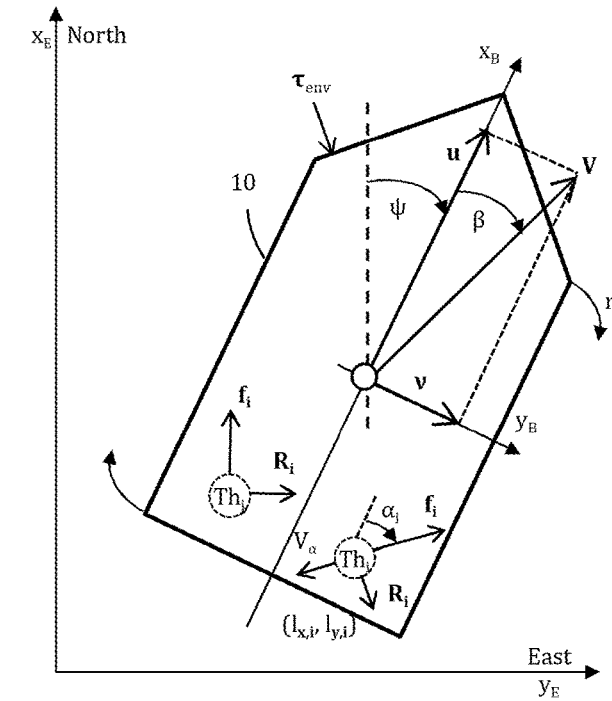
FIG. 1 shows an example of a motion model of a ship and definitions of coordinate systems and velocities used in the motion model.

Classically, a ship is considered as a rigid body having six degrees of freedom (6DOF) of movement in three-dimensional space. Specifically, the ship is free to change position as forward/backward (surge), up/down (heave), left/right (sway) translation in three perpendicular axes, combined with changes in orientation through rotation about three perpendicular axes, often termed yaw (normal axis), pitch (transverse axis), and roll (longitudinal axis). Exemplary embodiments of the invention relate to controlling the horizontal motion of a ship on the ocean surface and therefore only the horizontal 3 degrees of freedom (3DOF) motion will be considered for simplicity herein, while embodiments of the invention can be applied to 6DOF too. Referring to FIG. 1, the motion of a vessel can be described using two coordinate systems: a body-fixed coordinate system $(x_B, y_B)$, which is attached to vessel's own frame of reference and located at the center of mass of the vessel, and an inertial Earth-fixed coordinate system $(x_E, y_E)$, such as North-East-Down (NED) coordinate system. The Earth-fixed generalized position is described by $\eta=[X\ Y\ \psi]^T$. Here, X, Y is a position of the vessel in the Earth-fixed coordinate system and $\psi$ is a heading angle. The heading angle $\psi$ represents the orientation of the vessel in the Earth-fixed coordinate system (i.e. direction in which the vessel is pointing at any given time instant relative to the Earth-fixed coordinate system). The velocity of the vessel is usually body-fixed generalized velocity described by $v=[u\ \upsilon\ r]^T$. Here, u is the surge velocity, i.e. the forward velocity u in the direction of the bow, $\upsilon$ is the sway velocity, i.e. the sideways velocity towards the starboard, and r is the yaw velocity. The total velocity V is the resultant velocity of u and $\upsilon$, and it represents the direction of the motion of the vessel, or the intended direction of travel, the course. Ideally, the heading and the intended course would be same. In practice, the vessel is affected by external forces, such as the speed and direction of the wind, or water currents and waves on the ocean. These external forces are generally referred as environmental forces $\tau_{env}$ herein. The angle between the heading and course is called a sideslip angle $\beta$ of the vessel.

Motion control systems (MCS) of marine vessels are typically able to control the position and heading of a vessel and move the vessel in any desired direction by using thrusters that are constantly active and automatically balance the environmental forces (wind, waves, current etc.). When it comes to autonomous vessels and automated steering, the motion control is a task of particular interest. It deals with the design of control laws that allow the ship to perform specific tasks, such as keeping a position and heading angle, tracking waypoints, or following desired paths.

FIG. 2 shows an overview of an exemplary control system hierarchy for automated ships. In the example, the overall control system for guidance, navigation, and control of the ship (GNC) may contain three main components: a guidance system 22, a motion control system (MCS) 20, and a navigation system 24.

The navigation system 24 refers generally to means configured to provide observations of at least the current ship positions and velocities, i.e. the current measured or estimated state of the ship, $(\hat{\eta}, \hat{v})$ transformed to the appropriate coordinate system. The navigation system 24 may comprise a positioning system in combination with a motion sensor system (e.g. accelerometers and gyros) to provide measurements y, and an observer 240, that can also be called sensor fusion. Examples of different types of positioning systems include a global navigation satellite system (GNSS), high precision acoustic positioning systems (HiPAP), and laser-based positioning systems. Typically, instead of measuring with motion sensors all states that are required, some unmeasured states may be reconstructed or estimated by the observer 240 from those that are measured. In addition, the observer 240 typically filters out the wave-frequency vessel motions. It should be appreciated that embodiments of the invention are not limited to any implementation of the navigation system 24, or the observer 240, or to any source of current measured or estimated state of the ship $(\hat{\eta}, \hat{v})$.

Figure 2A:
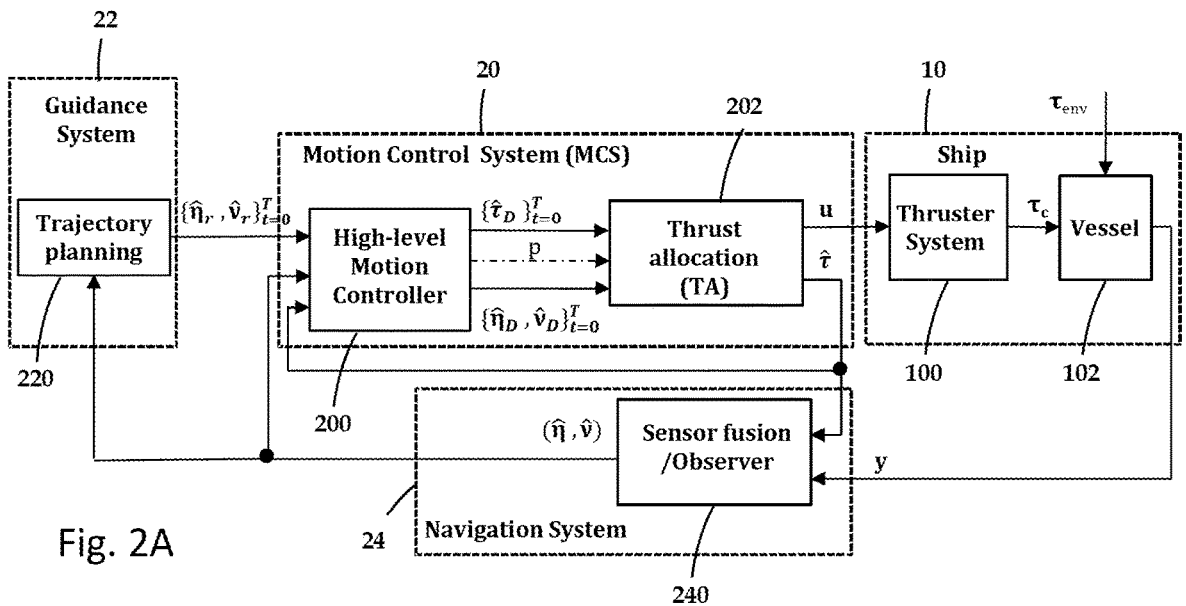
FIG. 2A shows a functional block diagram illustrating an exemplary vessel control system.

The guidance system 22 refers generally to means configured to provide or compute references, e.g. the desired positions $\hat{\eta}_r$ and velocities $\hat{v}_r$, to the motion control system 20 to control the vessel towards its trajectory or path. There are various strategies for the guidance system, and the most common strategies are speed and heading control, trajectory tracking and path following. Generally, the guidance system 22, or a path or trajectory planning entity 220 thereof, aims to provide a path or trajectory which fulfils some specific requirements, such as minimum time or fuel optimization. To that end, the guidance system 22 may receive waypoints based on weather data and operator inputs which describe the vessel's desired positions (or waypoints) at different times. The guidance system 22 could also receive the current ship positions and velocities, i.e. the measured or estimated states of the ship $(\hat{\eta}, \hat{v})$, provided by, e.g. the navigation system 24 or the observer 240, to generate feasible desired references. The references may define a set-point, a reference path or a reference trajectory. In embodiments of the invention, the references are time-variant references that defines a current reference states and predicted reference states $\hat{\eta}_r$ and $\hat{v}_r$ for the desired future motion, path or trajectory over a prediction horizon T in time from time t=0 to T, depicted by $$\{\hat{\eta}_r, \hat{v}_r\}_{t=0}^T$$

in FIG. 2A. It should be appreciated that embodiments of the invention are not limited to any implementation of the guidance system 22, or the trajectory planning 220, or to any source of time-variant references.

The motion control system (MCS) 20 determines and performs control actions required to move the ship 10 to the reference that is provided by the guidance system 22. To that end, the MCS 20 may receive the time-variant references $$\{\hat{\eta}_r, \hat{v}_r\}_{t=0}^T$$

and the current state $$\{\hat{\eta}, \hat{v}\}_{t=0}^T.$$

Particularly, the MCS 20 is configured to calculate the total forces and torque (e.g. a demanded generalized force $\tau_D$) that the thruster system 100 should apply on the ship 10 and to distribute the demanded forces and torque among the individual thrusters $Th_i$ available in the thruster system 100 so that the resultant force and torque they produce matches the demanded forces and torque. In the example shown in FIG. 2A, the control input to the thruster system 100 is depicted by u.

The thruster system 100 of the ship 10 may be equipped with any number and different types of actuators or thrusters depending on the intended use. The purpose of the actuator is to produce a controlled force on the vessel to obtain the desired movement. Examples of different types of thrusters include main propellers, tunnel thrusters, jet thrusters, and azimuth thrusters. Further, there may be other types of actuators affecting the movement of the vessel, such as rudders, stabilizing fins, and control surfaces. Naturally all thrusters of the ship shall be controlled, and possible other actuators shall be considered when providing the control input u to the thruster system 100. However, only controlling of rotatable thrusters, and particularly azimuthing podded thrusters, will be discussed in more detail herein.

An azimuth podded thruster comprises a propeller placed in a pod mounted usually under the hull and rotatable (azimuth) freely in the horizontal plane so that it can produce forces in different directions. It allows making a separate rudder unnecessary, if desired. This is also referred to as thrust vectoring since both the magnitude and direction of the force can be controlled. In the example illustrated in FIG. 1, two rotatable thrusters $Th_i$ are shown, wherein i is a thruster index, i=1, 2, . . . M, but any number M of thrusters can be employed. The control forces and torques $\tau_i$ created by an individual thruster $Th_i$ on the ship are dependent on its location (mounting position) and orientation and on the force (thrust) $f_i$ produced. The moment arms $l_{x,i}$ and $l_{y,i}$ relative to the center of mass of the vessel 10 define the mounting position of a thruster $Th_i$ in the body-fixed coordinate system, and $\alpha_i$ is the angle or orientation of thruster $Th_i$ taken clockwise from the $x_B$ axis of the body-fixed coordinate system, i.e. from the heading of the vessel. The force $f_i$ produced by a thruster $Th_i$ may be assumed to be proportional to the square of the propeller speed or propeller angular velocity $n_i$ that is typically given in revolutions per minute (RPM) or revolutions per second.

For low speed, an axial thrust magnitude $f_i$ of the thruster $Th_i$ may be given by $$f_i = k_i n_i |n_i|, \tag{1}$$

where $k_i$ is a constant.

The thrust configuration vector for $Th_i$ may be given by $$t_i = \begin{bmatrix} \cos\alpha_i \\ \sin\alpha_i \\ l_{x,i}\sin\alpha_i - l_{y,i}\cos\alpha_i \end{bmatrix}. \tag{2}$$

A generalized force $\tau_i$ (the forces and torques) generated by a thruster $Th_i$ can be written as $$\tau_i = t_i \ f_i = \begin{bmatrix} \cos\alpha_i \\ \sin\alpha_i \\ l_{x,i}\sin\alpha_i - l_{y,i}\cos\alpha_i \end{bmatrix} f_i. \tag{3}$$

The resulting generalized force $\tau_c$ generated by all M thrusters can be written as $$\tau_c = h(\alpha, n) \tag{4}$$

where $\alpha$ is a vector of thruster angles and n is a vector of propeller speeds of M thrusters. The function h may have the form $$\tau_c = T(\alpha)f(n) \tag{5}$$

where f(n) is a vector of thrust magnitude of M thrusters $$f(n) = \begin{bmatrix} f_1(n_1) \\ \vdots \\ f_M(n_M) \end{bmatrix} \tag{6}$$

and $T(\alpha)$ a matrix describing the geometry of the thruster configuration $$T(\alpha) = [t_1, \ldots, t_M] \tag{7}$$

where the columns $t_i$ are thrust configuration vectors of M thrusters.

FIG. 3 illustrates an exemplary thruster system 100 that comprises two electric podded azimuth thrusters (such as Azipod®) $Th_1$ and $Th_2$. Typically, podded azimuth thrusters $Th_i$ are configured and positioned below the ship hull 12 at the stern of the marine ship 10. In the case of two podded azimuth thrusters $Th_1$ and $Th_2$, they may be positioned adjacent to each other such that one is on the port side and one on the starboard side of the ship hull 12. Often the podded azimuth thruster 600 may be operated both in pulling and pushing operation modes. Typically, one of the operation modes is the principal operation mode to be used in open water, the other being applied temporarily in ports, for example.

The main parts of the podded azimuth thrusters $Th_1$ and $Th_2$ illustrated in FIG. 3 comprise a steering module and a propulsion module. The steering module is intended for connection into the ship's hull 12 and acts as the structural interface with the propulsion module. In an embodiment, the steering module may comprise a bearing support 120, 121, such as a slewing bearing, mounted to the ship hull 12 and a steering device 122, 123 on the bearing support 120, 121 inside the ship. The steering device 122, 123 generally refers to one or more steering actuators and possibly gear, as well as functional accessories and connection points for propulsion and steering. The steering actuator(s) may comprise one or more electric steering motors with gearboxes. The steering device 122, 123 may be connected to receive the electric power for the steering operation from an electric power plant 110 of the ship. The propulsion module is located outside the hull 12 and may include a hydrodynamic optimized submerged housing, called a pod 124, 125, and a strut 129, 130 coupling the pod 124, 125 with the steering module. The propulsion module is rotatably connected to the steering module, so that the propulsion module can be rotated in relation to the ship hull 12, preferably full 360 degrees around its vertical axis, to adjust the thruster angle $\alpha$. Inside the pod 124, 125 is provided an electric variable-speed propulsion motor 126, 127 driving a fixed-pitch propeller 128, 129 that is mounted directly onto the motor shaft, to provide the required thrust or force $\tau_i$. The pod 124, 124 may further comprise shaft bearings, shaft sealings, etc. required. Control cables and power supply bus bars, etc., required for the propulsion motor 126, 127 are arranged to extend from the steering module via inside the strut 129, 130. The electric motor 126, 127 may be coupled via respective propulsion drive (such as a frequency converter) 112, 114 with the electric power plant 110. The purpose of the propulsion drive 112, 114 is to control the torque and the variable-speed of the electric motor 126, 127 and thereby the rotation speed n of the propeller 128, 129. The steering devices 122, 123 and the propulsion drives 112 may controlled by control signals u from a ship control system, such as the motion control system 20, to set the required thruster angels α and propeller speeds n. A control interface to the ship control system, such as the motion control system 20, may implemented by any suitable communication media or fieldbus technology, such with a serial data link and by hard wired connections. The electric plant 120 refers generally to any source or sources of electric power sources. The electric power plant 120 may comprise, for example, a diesel generator, a nuclear power plant, a fuel cell, a steam generator, a wind generator, a solar generator, etc.

Thruster allocation (TA) refers to the task of distributing a desired generalized force $\tau_D$ between the thrusters. The thrust allocator determines the corresponding thrust magnitude and direction for each thruster in order to realize the desired generalized force $T_D$. The low-level thruster controllers will control the propeller pitch and/or speed, torque, and delivered power. Thus, the main goal of the TA is to realize $\tau_D$ at all times. However, due to the redundancy in actuation (overactuated system) there is freedom in choosing how to distribute the forces, that is, choosing control input u=(n, α). The more thrusters the ship is equipped with, the more combinations of inputs u can be used to produce $\tau_D$. The problem of choosing the input u can be formulated as a constrained optimization problem which search for the best solution within constrains, such as physical limitations on actuators or thrusters, while a cost function involves minimization of certain property, typically fuel or power consumption. The thruster allocation (TA) may be implemented by Model Predictive Control (MPC), for example. Regardless of used optimization method for optimal thrust allocation, it is necessary to define a number of limitations and constraints in order to meet all physical preconditions related to thrusters and their capabilities. Examples of constraints and limitations that may commonly considered are related to thruster saturation, forbidden or flushing zones, feasible shaft speed and/or propeller pitch rate of change, feasible thrust rate of change, feasible thruster azimuth angle rate of change, etc.

In the exemplary architecture illustrated in FIG. 2A, the motion control system (MCS) 20 is so-called decoupled MCS, where these tasks of the MCS are divided into several levels of control in a hierarchical structure. First, a high-level motion controller 200 calculates the demanded generalized force $\tau_D$ (total force and torque) that should be exerted on the ship 10. Again, the problem of choosing the optimal demanded generalized force $\tau_D$ can be formulated as a constrained optimization problem which search for the best solution for the desired generalized force $\tau_D$ within constrains, while minimizing certain property, typically fuel or power consumption. The high-level motion controller may be implemented as a Model Predictive Control (MPC), for example. Secondly, a lower-level thruster allocation (TA) controller 202 calculates a set-point in orientation and propeller speed, i.e. the control input u=(n, α), for the individual thrusters in order to realize the force $\tau_D$ requested by the motion controller 200. As noted above, also the thruster allocation (TA) can be formulated as a different constrained optimization problem which search for the best solution for control signals u within constrains, such as physical limitations on actuators or thrusters, while a cost function involves minimization of certain property, typically fuel or power consumption. The thrust allocation (TA) controller may be implemented as a Model Predictive Control (MPC), for example. The decoupled design allows a flexible and modular design since the high-level controller 200 may remain the same for ships with different actuator configurations while only the TA 202 is updated with the new configuration. It also allows the possibility to combine solutions from different vendors. However, this might also be an important disadvantage. For instance, the decoupling imposes that the high-level motion controller 200 do not consider physical limitations of the thrusters. The high-level motion controller 200 at best has an approximate model of the capabilities in the thruster system. Therefore, this approach has a limited capability to handle constraints for the thrusters mainly in terms of the rate of changes for the individual thrusters and to understand the long-time benefits. The TA 202, on the other hand, while trying to instantaneously fulfill the desired force $\tau_D$, will if necessary, simultaneously rotate the thrusters so that the propellers may run with positive rpm in order to minimize the power consumption in accordance with the optimization problem. However, a few seconds later it may be necessary to rotate the thrusters in order to fulfill the new desired force $\tau_D$. The thruster system 100 may momentarily be unable to produce thrust in a certain direction for the duration it takes to rotate the thrusters. Since the high-level motion controller 200 does not account for this, there will be a significant mismatch between the provided force $\tau_c$ and the desired force $\tau_D$. To avoid situations where thrusters must be turned and during that period cannot provide the required forces and torque, it may be needed to limit the bandwidth of the high-level controller, which will affect the performance.

Combined MCS approaches have also been proposed where the high-level motion controller 200 directly determines the desired angles and speeds for the individual thrusters Th$_i$. Bärlund et. al., Nonlinear MPC for combined motion control and thrust allocation of ships, Proceedings of the 21 st IFAC World Congress, Berlin, Germany, July 2020 discloses a Model Predictive Control (MPC) based combined MCS that offers improvements in control performance compared to capabilities of the traditional decoupled approaches. The combined approach, deviating from the traditional structure that formulates two different optimization problems, combines the work of both motion controller 200 and TA controller 202 into a single optimization problem and single controller, such as a single MPC controller. The combined MCS has full knowledge on the state and limitations of the thrusters and is able to coordinate them more efficiently throughout the control horizon. It accounts for the delay caused by the rotation time of the thrusters when planning the motion. The disadvantages of the combined MCS approaches are that they are non-modular and will result in an optimization problem that is more difficult to solve. A typical case to consider is when a ship should brake efficiently during autonomous operation.

Recently, parts of the problem have been addressed in a conference publication Haseltalab et. al., Model Predictive Trajectory Tracking Control and Thrust Allocation for Autonomous Vessels, Emerging Technologies, 70, 2020, p. 214-237. In Haseltalab et. al., the thrust allocation (TA) problem is integrated into an MCS-based ship maneuvering controller in the presence of rotatable thrusters. The TA problem is formulated over a finite horizon and solved with regard to the power consumption, changes in the angle and speed of actuators, and the operating constraints. In the proposed control approach, several linearization techniques have been employed and simplifications have been assumed which are important for a complete functional solution. For example, constraints for the thruster angles and propeller speeds are assumed to be constants over the horizon considered by the thrust allocation algorithm, and a simple model for propeller forces is used.

An aspect of the invention is to provide a predicted thrust allocation (TA) for vessels using rotatable thrusters, while circumventing problems and disadvantages of the prior art approaches.

In embodiments of the invention, the high-level motion controller 200 is decoupled from the thrust allocation (TA) 202, as illustrated in the example of FIG. 2A, to allow a modular design.

In embodiments of the invention, the high-level motion controller 200 is configured to provide the thrust allocation (TA) 202 with generalized forces demanded for the current instant of time as well as a prediction of future generalized forces demanded over a predicted future time, and optionally one or more other reference predictions or time varying allocation parameters. In embodiments of the invention, the thrust allocation (TA) 202 is provided with time-varying generalized forces $\hat{\tau}_D$ predicted to be demanded on the ship 10 over a prediction horizon T in time from time t=0 to T, depicted by $$\{\hat{\tau}_D\}_{t=0}^T$$

in FIG. 2A. When predictions of the future desired forces and torque are made available to the lower-level thrust allocation, the lower-level thrust allocation will be aware of what is needed in the future and use the predictions or time-varying allocation parameters to make efficient changes based on the desired current and future references.

In an embodiment, the high-level motion controller 200 receives (step 40 in FIG. 4) as inputs a measured, or estimated state of the ship ($\hat{\eta}$, $\hat{v}$) and a time-varying reference state $$\{\hat{\eta}_r, \hat{v}_r\}_{t=0}^T,$$

i.e. reference states predicted over a prediction horizon T in time from time t=0 to T. The reference may for example be a set-point, path or trajectory. Using the time-varying reference state $$\{\hat{\eta}_r, \hat{v}_r\}_{t=0}^T,$$

the motion controller 200 is configured to calculate or estimate (step 42 in FIG. 4) the time-varying generalized forces $\hat{\tau}_D$ predicted to be demanded on the ship 10 over a prediction horizon T in time from time t=0 to T, depicted by $$\{\hat{\tau}_D\}_{t=0}^T$$

in FIG. 2A, in order to follow the time-varying reference. In embodiments of the invention, a predictive control method, e.g. MPC, is applied in the high-level motion controller 200 to calculate the time-varying generalized forces $\hat{\tau}_D$. The high-level motion controller 200 provides (step 44) the time-varying generalized forces $\hat{\tau}_D$, and optionally one or more other reference predictions or time-varying allocation parameters, to the lower-level thrust allocation control TA 202.

In embodiments of the invention, the one or more other reference predictions include a prediction of future generalized velocity of the ship 10 and/or a prediction of future generalized position of the ship 100 over a predicted future time.

In embodiments of the invention, the thrust allocation (TA) 202 is provided with a time-varying generalized velocity and/or position of the ship 10 over a prediction horizon T in time from time t=0 to T, depicted by $$\{\hat{\eta}_D, \hat{v}_D\}_{t=0}^T$$

in FIG. 2A.

In embodiments of the invention, the thrust allocation (TA) 202 is provided with time-varying allocation parameters, calculated based on a time-varying generalized velocity and/or position of the ship 10 over a prediction horizon T. The time-varying allocation parameters may comprise parameters, for instance, for the cost function, or bounds or constraints on variables in the TA optimization problem used in the thrust allocation (TA) 202. In embodiments, the time-varying allocation parameters may include bounds or constraints dependent on a predicted future generalized velocity $\hat{v}_D$. For example, bounds for thruster angels may be more limited at higher velocities. In embodiments of the invention, the parameters for the cost function may include one or more of user-selected tuning parameters $Q_A$ presented in Equation (15) below. In embodiments, the time-varying allocation parameters may include any time-varying allocation control signal or parameter or user input (e.g. via a user interface of the ship) that is configured to produce an effect upon or change in the thrust allocation in a predetermined manner, such as a change in bounds or constrains, etc.

In embodiments of the invention, the time-varying allocation parameters (depicted by a dashed arrow p in the example of FIG. 2A) are calculated and/or generated and provided to the thrust allocation (TA) 202 by the high-level motion controller 200. For the calculation, the high-level motion controller 200 may have generic information on the thruster configuration, such as physical limitations on actuators or thrusters, or fuel or power consumption related data for defining parameters for a cost function, which is a disadvantage in comparison with calculation of also these parameters by the thrust allocation (TA) 202.

In embodiments of the invention, the time-varying allocation parameters may be calculated and/or generated and provided to the thrust allocation (TA) 202 by a separate calculator unit, such as an allocation parameter calculator 204 illustrated in the example of FIG. 2B. In the example embodiment shown, the allocation parameter calculator is provided between the high-level motion controller 200 and the thrust allocation (TA) to receive the time-varying generalized velocity and/or position $$\{\hat{\eta}_D, \hat{v}_D\}_{t=0}^T$$

and to provide the parameters p to the thrust allocation (TA). In embodiments, the allocation parameter calculator 204 may be configured to receive any time-varying allocation control signal or parameter or user input (e.g. via a user interface of the ship) that is configured to produce an effect upon or change in generation or calculation of the allocation parameters in a predetermined manner, such as a change in bounds or constrains, etc. For the calculation, also the allocation parameter calculator 204 may have generic information on the thruster configuration, such as physical limitations on actuators or thrusters, or fuel or power consumption related data for defining parameters for a cost function. In embodiments, the parameter allocation calculator 204 may be arranged to receive the required configuration data from the thrust allocation (TA) 202. In embodiments of the invention, the parameter calculator 204 may be regarded as a part of a distributed thrust allocation (TA) 202.

In embodiments of the invention, the time-varying generalized velocity and/or position $$\{\hat{\eta}_D, \hat{v}_D\}_{t=0}^T$$

that is forwarded to the lower-level thrust allocation (TA) 202 (or to the allocation parameter calculator 204) by the high-level motion controller 200 equals to the time-varying reference state $$\{\hat{\eta}_r, \hat{v}_r\}_{t=0}^T$$

provided by the guidance system 22 or a corresponding system, including embodiments wherein the time-varying generalized velocity and/or position $$\{\hat{\eta}_D, \hat{v}_D\}_{t=0}^T$$

may be provided directly from the guidance system 22 through or bypass the high-level motion controller 20.

In embodiment of the invention, the high-level motion controller 200 is configured to further provide the lower-level thrust allocation (TA) 202 with a predicted future generalized velocity $\hat{v}_D$ of the ship 10 over a prediction horizon T in time from time t=0 to T, depicted by $$\{\hat{v}_D\}_{t=0}^T$$

in FIG. 2A. The lower-level thrust allocation can use a predicted future generalized velocity $V_D$ to define time varying constraints for thruster angles and propeller speeds. For example, thruster angels may be more limited at higher velocities.

In embodiment of the invention, the high-level motion controller 200 is configured to further provide the lower-level thrust allocation (TA) 202 with a predicted future generalized position $\hat{v}_D$ of the ship 10 over a prediction horizon T in time from time t=0 to T, depicted by $$\{\hat{\eta}_D\}_{t=0}^T$$

in FIG. 2A.

In embodiment of the invention, the lower-level thrust allocation controller (TA) 202 is configured to receive (step 50 in FIG. 5) the predicted time-varying generalized forces $$\{\hat{\tau}_D\}_{t=0}^T,$$

and optionally one or more other reference predictions, such as a time-varying generalized velocity and/or position of the ship $$\{\hat{\eta}_D, \hat{v}_D\}_{t=0}^T,$$

or time-varying allocation parameters, and take them into account in generating of control signals u to a plurality of individual thrusters available in the thruster system 100 to distribute the desired generalized forces into individual forces of the plurality of individual thrusters (step 52 in FIG. 5), and to supply (step 54 in FIG. 5) the generated control signals u to the thruster system to control a thruster orientation and/or a generated thrust, such as through controlling propeller speed and/or pitch, of at least one thruster.

In embodiment of the invention, the constrains of the lower-level thrust allocation vary over the prediction horizon depending on one or more of following external variables: time t, the predicted state $\{\hat{\eta}, \hat{v}\}$ of the ship, the predicted velocity $\hat{v}_D$, the predicted position $\hat{v}_D$ of the ship.

In embodiment of the invention, a rudder force of a rotatable thruster is considered (estimated and used) when estimating the generalized force $\tau_i$ generated by the rotatable thruster $Th_i$.

In embodiment of the invention, both a propulsion force and a rudder force of a rotatable thruster are considered (estimated and used) when estimating the generalized force $r_i$ generated by each thruster $Th_i$.

The configuration of the ship may not have a separate rudder. However, the azimuth thruster potentially causes a force comparable with a rudder force. Due to a rudder like geometry of the azimuth thruster body, such as the pod 124, 125 and strut 129, 130 shown in FIG. 3, it will not only exert force due to rotation of the propeller, but it will also have rudder effects at non-zero speed ship. The present invention allows considering also the rudder forces in the thruster allocation, which decreases the error or mismatch between the desired generalized thruster force $\tau_D$, or the calculated thruster force within the thrust allocation TA 202, and the actual force exerted by the thruster system 10 on the ship 10.

An example of a thrust allocation procedure according to embodiments of the invention may be as follows. An exemplary simplified model of the propulsion force $T_i$ (thrust) for the podded thruster $Th_i$ can be written as $$T_i = \gamma_0 D_i^4 |n_i| n_i + \gamma_1 D_i^3 V_a |n_i| + \gamma_2 D_i^2 |V_a| V_a \qquad (8)$$

where
i is the thruster index, i=1, 2, . . . M
n is the propeller speed,
$V_a$ is the speed of the water stream along the propeller axis of the podded thruster $Th_i$, which in turn relates to the velocity V of the ship,
$D_i$ is the diameter of the propeller of the podded thruster $Th_i$,
$\gamma_0$, $\gamma_i$, and $\gamma_2$ are propeller-specific coefficients.
In a special case, where $\gamma_i$, and $\gamma_2$ are neglected, $T_i$ is equal to $f_i$ presented in Equation (1) above.

An exemplary simplified model for the rudder force $R_i$ for an azimuthing thruster $Th_i$ can be written as $$R_i = \gamma_r V_a \sin(\alpha_i - \beta_i) \qquad (12)$$

where $\alpha_i$ is the thruster angle, $\beta_i$ is angle of the water flow at the thruster, and $\gamma_r$ a coefficient related to a specific rudder geometry.

For each thruster the generalized force on the center of gravity of the vessel is $$\tau_i = h(u_i, v) = \begin{bmatrix} 1 & 0 \\ 0 & 1 \\ -l_{y,i} & l_{x,i} \end{bmatrix} \begin{bmatrix} \cos\alpha_i & -\sin\alpha_i \\ \sin\alpha_i & \cos\alpha_i \end{bmatrix} \begin{bmatrix} T_i \\ R_i \end{bmatrix} \qquad (13)$$

where
$u_i$ is the collection of control signals for the azimuthing thruster $Th_i$,
v is the Body-fixed generalized velocity of vessel,
$l_{x,i}$, $l_{y,i}$ is the location of the azimuthing thruster $Th_i$ in the Body-fixed coordination.
Let $$H(u, v) = \sum_{i=1}^{M} h(u_i, v) \qquad (14)$$

where u is the control input (collection of control signals for all thrusters), then one exemplary formulation of the optimization problem minimizing power consumption with respect to all $u_k$, k=1 . . . N, becomes $$\min_k \sum_{k=1}^{N} P(u_k, v_k) + (u_k - u_{k-1})^T Q_\Delta(v_k)(u_k - u_{k-1}) \qquad (15)$$

Subject to constrains that vary over the prediction horizon N depending on time and velocity.

$$u_{k+1} = F(u_k, v_k), k = 0, \dots, N-1 \qquad (16a)$$

$$H(u_k, v_k) = \tau_k, k = 0, \dots, N \qquad (16b)$$

$$u_k^{lo}(v_k) \le u_k \le u_k^{hi}(v_k), k = 1, \dots, N \qquad (16c)$$

where
k is the sample time index,
$u_k$ is the control input at sample time k,
$v_k$ is the generalized velocity of vessel at sample time k, $$u_k^{lo}(v_k)$$

is the minimum value $u_k$ is allowed to be for $v_k$ at sample time k, $$u_k^{hi}(v_k)$$

is the maximum value $u_k$ is allowed to be for $v_k$ at sample time k,
N is the prediction horizon in number of sample times,
$Q_\Delta$ are user-selected tuning parameters
$P(\cdot)$ is a power-consumption related cost function, and
$F(\cdot)$ represent the thruster dynamics.

The motion control system (MSC), the high-level motion controller 200, and the lower-level thrust allocation (TA) controller 202 and their functions may be implemented by various techniques. For example, they may be implemented in hardware (one or more devices), firmware (one or more devices), software (one or more modules), or combinations thereof. For a firmware or software, implementation can be through modules (e.g., procedures, functions, and so on) that perform the functions described herein. The software codes may be stored in any suitable processor/computer-readable data storage medium(s) or memory unit(s) and executed by one or more processors/computers. The data storage medium or the memory unit may be implemented within the processor/computer or external to the processor/computer, in which case it can be communicatively coupled to the processor/computer via various means as is known in the art. Additionally components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art. After reading this description, it will become apparent to a person skilled in the relevant art how to implement the disclosure using various computer systems and/or computer architectures. The high-level motion controller 200 and the lower-level thrust allocation (TA) controller 202 may also comprise input/output systems (1/O systems) to receive information from and send information to each other and/or other systems and components of the ship, such as the guidance system 22, the navigation system 24, and the thruster system 100.

In an example embodiment, the high-level motion controller comprises one or more processors, and one or more memories including computer program code, which, when loaded into the one or more processors and executed by the one or more processors, causes the controller to perform a computer-implemented method for providing the lower-level thrust allocation (TA) 202 with generalized forces demanded for the current instant of time as well as a prediction of future generalized forces demanded over a predicted future time, and optionally one or more other reference predictions.

In an example embodiment, the lower-level thrust allocation controller comprises one or more processors, and one or more memories including computer program code, which, when loaded into the one or more processors and executed by the one or more processors, causes the controller to perform a computer-implemented method for receiving generalized forces demanded for the current instant of time as well as a prediction of future generalized forces demanded over a predicted future time, and optionally one or more other reference predictions, and for using the received generalized forces as well as the received prediction of future generalized forces, and optionally one or more other received reference predictions to provide the calculation of the control input to the thruster system with constrains that vary over the prediction horizon. It should be appreciated that the lower level thrust allocation controller may comprise more than one calculation entities or units among which different tasks and calculations may be distributed. In embodiments, there may be a separate calculation unit, such as the allocation parameter calculator 204 shown in FIG. 2B, that may perform preparing calculations for the lower-level thrust allocation.

An example embodiment provides a computer-readable medium comprising the computer program code for the high-level motion controller 200, which, when loaded into the controller 200 and executed by the controller 200, causes the controller 200 to perform a computer-implemented method for providing the lower-level thrust allocation (TA) 202 with generalized forces demanded for the current instant of time as well as a prediction of future generalized forces demanded over a predicted future time, and optionally one or more other reference predictions.

An example embodiment provides a computer-readable medium comprising the computer program code for the lower-level thrust allocation controller 202, which, when loaded into the controller 202 and executed by the controller 202, causes the controller 202 to perform a computer-implemented method for receiving generalized forces demanded for the current instant of time as well as a prediction of future generalized forces demanded over a predicted future time, and optionally one or more other reference predictions, and for using the received generalized forces as well as the received prediction of future generalized forces, and optionally one or more other received reference predictions to provide the calculation of the control input to the thruster system with constrains that vary over the prediction horizon.

The description and the related figures are only intended to illustrate the principles of the present invention by means of examples. Various alternative embodiments, variations and changes are obvious to a person skilled in the art on the basis of this description. The present invention is not intended to be limited to the examples described herein but the invention may vary within the scope and spirit of the appended claims.

The invention claimed is:

1. A motion control system, comprising:
a higher-level motion controller and a lower-level thrust allocation controller for controlling motion of a marine vessel, the higher-level motion controller being decoupled from the lower-level thrust allocation controller to allow a modular design,
wherein the higher-level motion controller is configured to determine desired generalized forces to be exerted on the marine vessel by a thruster system to achieve a desired motion of the marine vessel, and to input the desired generalized forces to the lower-level thrust allocation controller,
wherein the lower-level thrust allocation controller is configured to generate, based on the desired generalized forces, control signals to a plurality of individual thrusters available in the thruster system to distribute the desired generalized forces into individual forces of the plurality of individual thrusters, at least one of the plurality of individual thrusters being a rotatable or azimuthing thruster, and the control signals of the at least one rotatable or azimuthing thruster controlling at least a thruster orientation and a generated thrust,
wherein the higher-level motion controller is configured to determine and input to the lower-level thrust allocation controller both the desired generalized forces for the current instant of time and the desired future generalized forces to be exerted on the marine vessel, and
wherein the lower-level thrust allocation controller is configured to take the desired future generalized forces into account in generation of the control signals to the plurality of individual thrusters for the current instant of time.

2. The motion control system as claimed in claim 1, wherein
the higher-level motion controller is configured to input to the lower-level thrust allocation controller both the desired generalized forces both for the current instant of time and the desired future generalized forces to be exerted on the marine vessel, and a prediction of future generalized velocity of the marine vessel and/or a prediction of future generalized position of the marine vessel, and
the lower-level thrust allocation controller is configured to take the desired future generalized forces, and the predicted future generalized velocity of the and/or the predicted future generalized position of the marine vessel, into account in generation of the control signals for the current instant of time.

3. The motion control system as claimed in claim 1, wherein:
the lower-level thrust allocation controller is configured to receive the desired generalized forces both for the current instant of time and the desired future generalized forces to be exerted on the marine vessel from the high-level motion controller,
the lower-level thrust allocation controller is configured to receive allocation parameters from the high-level motion controller or an allocation parameter calculation unit, and
the lower-level thrust allocation controller is configured to take the desired future generalized forces, and the allocation parameters, into account in generation of the control signals for the current instant of time.

4. The motion control system as claimed in claim 1, wherein the lower-level thrust allocation controller is configured to estimate and use at least a propulsion force of the at least one rotatable or azimuthing thruster in generation of the control inputs.

5. The motion control system as claimed in claim 4, wherein the lower-level thrust allocation controller is configured to estimate and use both a propulsion force and a rudder force of the at least one rotatable or azimuthing thruster in generation of the control inputs.

6. The motion control system as claimed in claim 1, wherein the higher-level motion controller comprises one or more processors, and one or more tangible memories including computer program code, which, when loaded into the one or more processors and executed by the one or more processors, causes the higher-level motion controller to determine and input to the lower-level thrust allocation controller both the desired generalized forces both for the current instant of time and the desired future generalized forces to be exerted on the marine vessel.

7. The motion control system as claimed in claim 1, wherein the lower-level thrust allocation controller comprises one or more processors, and one or more tangible memories including computer program code, which, when loaded into the one or more processors and executed by the one or more processors, causes the lower-level motion controller to generate control signals to a plurality of individual thrusters available in the thruster system to distribute the desired generalized forces into individual forces of the plurality of individual thrusters, and to take the desired future generalized forces into account in generation of the control signals for the current instant of time.

8. A non-transitory computer-readable tangible medium comprising computer program code, which, when loaded into a higher-level motion controller, causes the higher-level motion controller to determine and input to a lower-level thrust allocation controller both a desired generalized force both for a current instant of time and a desired future generalized force to be exerted on a marine vessel over a prediction horizon.

9. A non-transitory computer-readable tangible medium comprising the computer program code which, when loaded into a lower-level thrust allocation controller causes the controller to generate control signals to a plurality of individual thrusters available in a thruster system to distribute a desired generalized force into individual forces of a plurality of individual thrusters, and to take the desired future generalized forces into account in generation of the control signals for the current instant of time.

10. A marine vessel, comprising a motion control system that further includes:
a higher-level motion controller and a lower-level thrust allocation controller for controlling motion of a marine vessel, the higher-level motion controller being decoupled from the lower-level thrust allocation controller to allow a modular design,
wherein the higher-level motion controller is configured to determine desired generalized forces to be exerted on the marine vessel by a thruster system to achieve a desired motion of the marine vessel, and to input the desired generalized forces to the lower-level thrust allocation controller,
wherein the lower-level thrust allocation controller is configured to generate, based on the desired generalized forces, control signals to a plurality of individual thrusters available in the thruster system to distribute the desired generalized forces into individual forces of the plurality of individual thrusters, at least one of the plurality of individual thrusters being a rotatable or azimuthing thruster, and the control signals of the at least one rotatable or azimuthing thruster controlling at least a thruster orientation and a generated thrust,
wherein the higher-level motion controller is configured to determine and input to the lower-level thrust allocation controller both the desired generalized forces both for the current instant of time and the desired future generalized forces to be exerted on the marine vessel, and
wherein the lower-level thrust allocation controller is configured to take the desired future generalized forces into account in generation of the control signals to the plurality of individual thrusters for the current instant of time.

11. A motion control system, comprising:
a higher-level motion controller and a lower-level thrust allocation controller for controlling motion of a marine vessel, the higher-level motion controller being decoupled from the lower-level thrust allocation controller to allow a modular design,
wherein the higher-level motion controller includes one or more processors, and one or more tangible memories including computer program code, which, when loaded into the one or more processors and executed by the one or more processors, causes the higher-level motion controller to
determine desired generalized forces to be exerted on the marine vessel by a thruster system for the current instant of time and desired future generalized forces to be exerted on the marine vessel to achieve a desired motion of the marine vessel,
input to the lower-level thrust allocation controller both the desired generalized forces and the desired future generalized forces, wherein the lower-level thrust allocation controller includes one or more processors, and one or more tangible memories including computer program code, which, when loaded into the one or more processors and executed by the one or more processors, causes the lower-level motion controller to
generate, based on the desired generalized forces, control signals to a plurality of individual thrusters available in the thruster system to distribute the desired generalize forces into individual forces of the plurality of individual thrusters, at least one of the plurality of individual thrusters being a rotatable or azimuthing thruster, and the control signals of the at least one rotatable or azimuthing thruster controlling at least a thruster orientation and a generated thrust,
take the desired future generalized forces into account in generation of the control signals to the plurality of individual thrusters for the current instant of time.

12. The motion control system as claimed in claim 11, wherein:
the lower-level thrust allocation controller is configured to receive the desired generalized forces both for the current instant of time and the desired future generalized forces to be exerted on the marine vessel from the high-level motion controller,
the lower-level thrust allocation controller is configured to receive allocation parameters from the high-level motion controller or an allocation parameter calculation unit, and
the lower-level thrust allocation controller is configured to take the desired future generalized forces, and the allocation parameters, into account in generation of the control signals for the current instant of time.

13. The motion control system as claimed in claim 11, wherein the lower-level thrust allocation controller comprises predictive control that is configured to predict future control inputs and/or future constraints based on the desired future generalized forces, and further configured to use the predicted future control inputs and/or predicted future constraints in generation of the control signals for the current instant of time.

14. The motion control system as claimed in claim 11, wherein the lower-level thrust allocation controller is configured to vary constraints of generation of the control inputs over the prediction horizon depending on one or more of: time, the predicted future generalized force, the predicted future generalized velocity of the marine vessel, the predicted future generalized position of the marine vessel, and the allocation parameters.

15. The motion control system as claimed in claim 11, wherein the lower-level thrust allocation controller is configured to estimate and use at least a propulsion force of the at least one rotatable or azimuthing thruster in generation of the control inputs.

16. A motion control system, comprising
a higher-level motion controller and a lower-level thrust allocation controller for controlling motion of a marine vessel,
wherein the higher-level motion controller is configured to determine desired generalized forces to be exerted on the marine vessel by a thruster system to achieve a desired motion of the marine vessel, and to input the desired generalized forces to the lower-level thrust allocation controller,
wherein the lower-level thrust allocation controller is configured to generate, based on the desired generalized forces, control signals to a plurality of individual thrusters available in the thruster system to distribute the desired generalized forces into individual forces of the plurality of individual thrusters, at least one of the plurality of individual thrusters being a rotatable or azimuthing thruster, and the control signals of the at least one rotatable or azimuthing thruster controlling at least a thruster orientation and a generated thrust, wherein the higher-level motion controller is configured to determine and input to the lower-level thrust allocation controller both the desired generalized forces both for the current instant of time and the desired future generalized forces to be exerted on the marine vessel, and wherein the lower-level thrust allocation controller comprises predictive control that is configured to predict future control inputs and/or future constraints based on the desired future generalized forces and further configured to use the predicted future control inputs and/or predicted future constraints in generation of the control signals for the current instant of time.

17. The motion control system as claimed in claim 16, wherein the higher-level motion controller is further configured to determine and input to the lower-level thrust allocation controller one or more further reference predictions or allocation parameters, and wherein the lower-level thrust allocation controller is configured to take also the one or more further reference predictions or allocation parameters into account in generation of the control signals for the current instant of time.

18. The motion control system as claimed in claim 16, wherein the predictive control is a Model Predictive Control (MPC).

19. A motion control system, comprising a higher-level motion controller and a lower-level thrust allocation controller for controlling motion of a marine vessel, wherein the higher-level motion controller is configured to determine desired generalized forces to be exerted on the marine vessel by a thruster system to achieve a desired motion of the marine vessel, and to input the desired generalized forces to the lower-level thrust allocation controller, wherein the lower-level thrust allocation controller is configured to generate, based on the desired generalized forces, control signals to a plurality of individual thrusters available in the thruster system to distribute the desired generalized forces into individual forces of the plurality of individual thrusters, at least one of the plurality of individual thrusters being a rotatable or azimuthing thruster, and the control signals of the at least one rotatable or azimuthing thruster controlling at least a thruster orientation and a generated thrust, wherein the higher-level motion controller is configured to determine and input to the lower-level thrust allocation controller both the desired generalized forces both for the current instant of time and the desired future generalized forces to be exerted on the marine vessel, and wherein the lower-level thrust allocation controller is configured to vary constraints of generation of the control inputs over the prediction horizon depending on one or more of: time, the predicted future generalized force, the predicted future generalized velocity of the marine vessel, the predicted future generalized position of the marine vessel, and allocation parameters.

20. The motion control system as claimed in claim 1, wherein the higher-level motion controller is further configured to determine and input to the lower-level thrust allocation controller one or more further reference predictions or allocation parameters, and wherein the lower-level thrust allocation controller is configured to take also the one or more further reference predictions or allocation parameters into account in generation of the control signals for the current instant of time.

* * * * *